Feb. 29, 1944. A. R. THOMPSON 2,343,098
PEAR PREPARATION MACHINE
Filed July 22, 1940 5 Sheets-Sheet 1

INVENTOR.
ALBERT R. THOMPSON
BY
*Philip A. Minnis*
ATTORNEY.

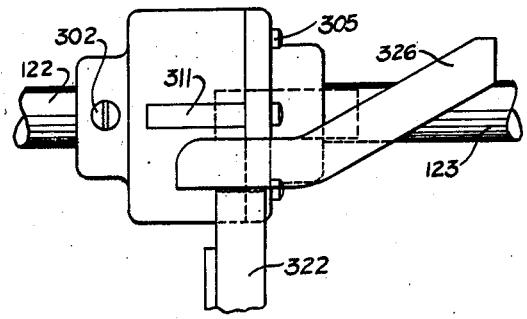
Fig_10_
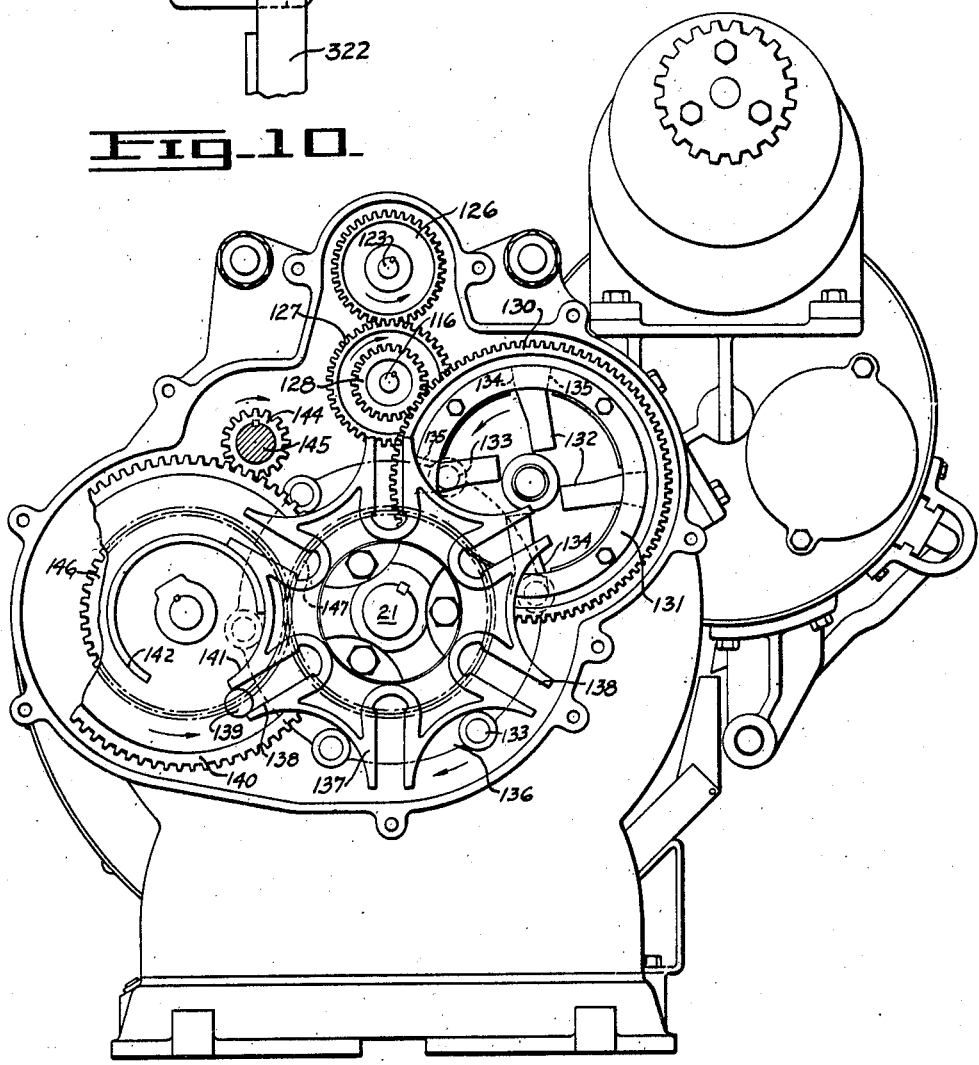
Fig_2_
INVENTOR.
ALBERT R. THOMPSON

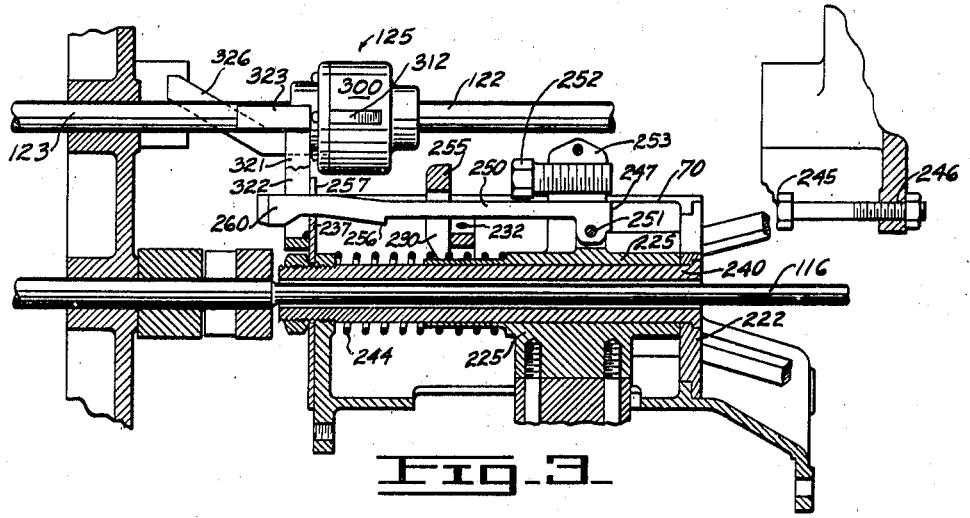
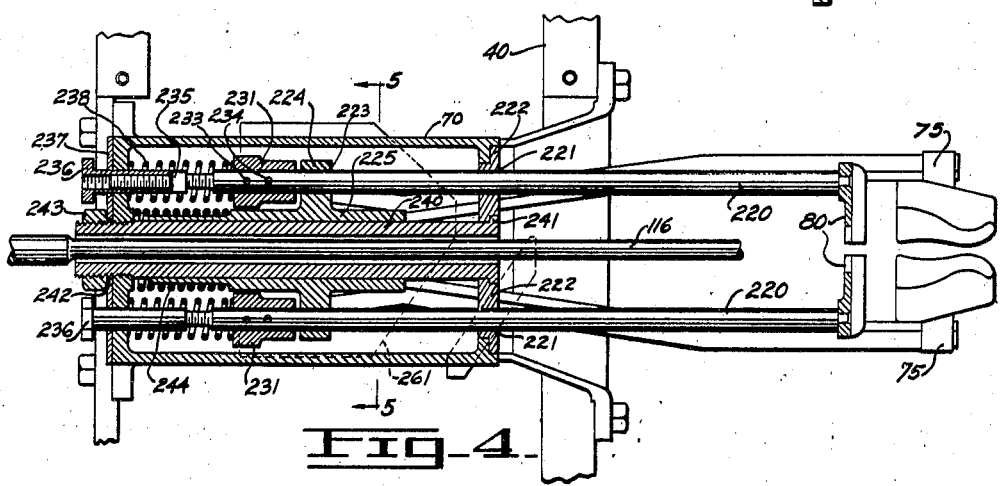
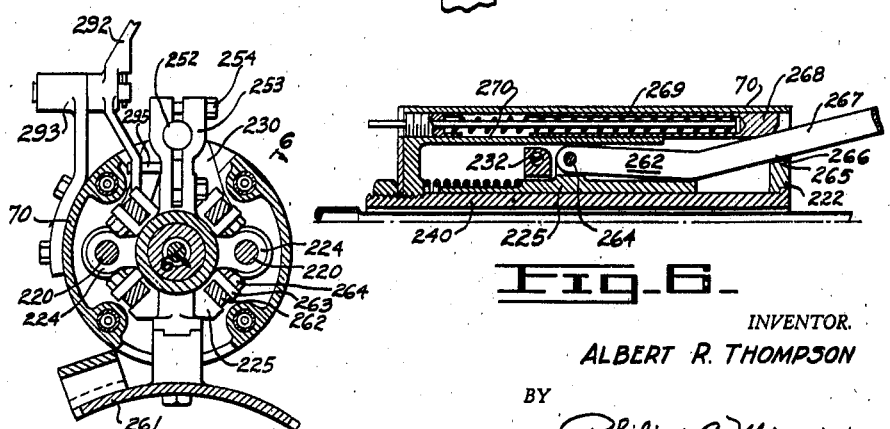

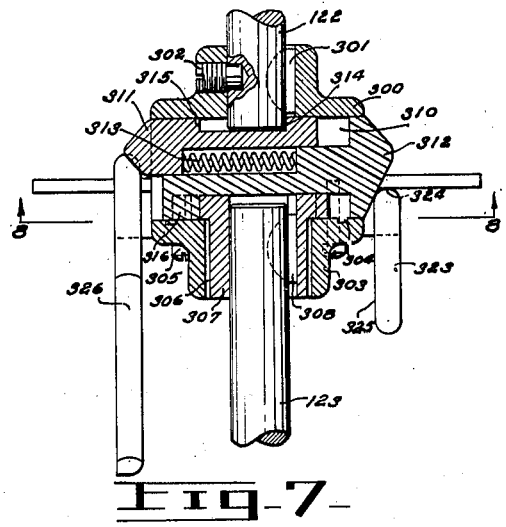
Fig-7-
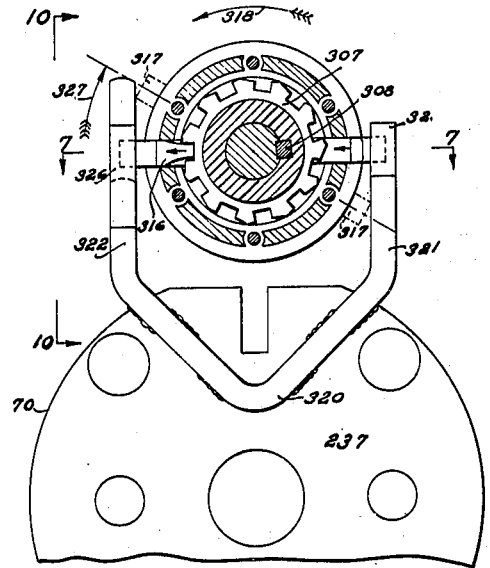
Fig-8-
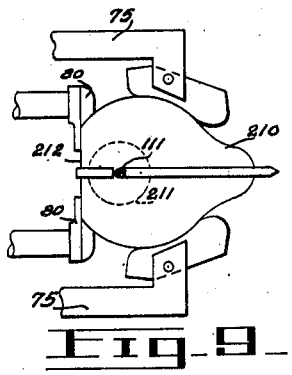
Fig-9-
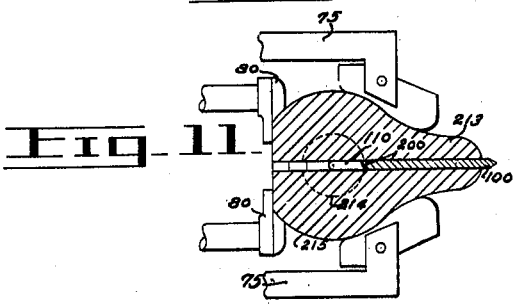
Fig-11-
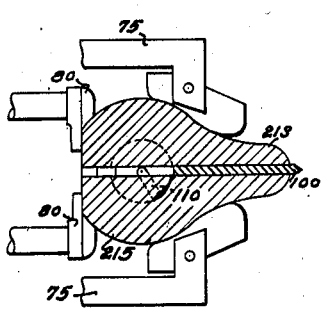
Fig-12-
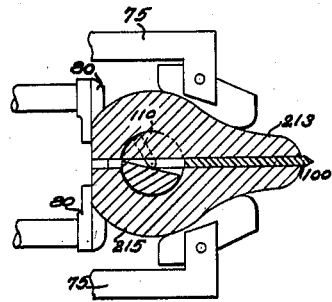
Fig-13-
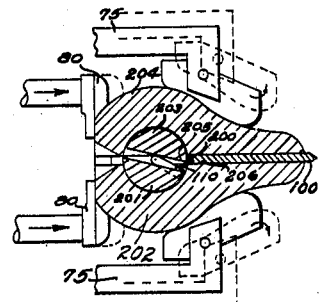
Fig-14-
INVENTOR
ALBERT R. THOMPSON
BY
ATTORNEY Feb. 29, 1944.　　A. R. THOMPSON　　2,343,098
PEAR PREPARATION MACHINE
Filed July 22, 1940　　5 Sheets-Sheet 5
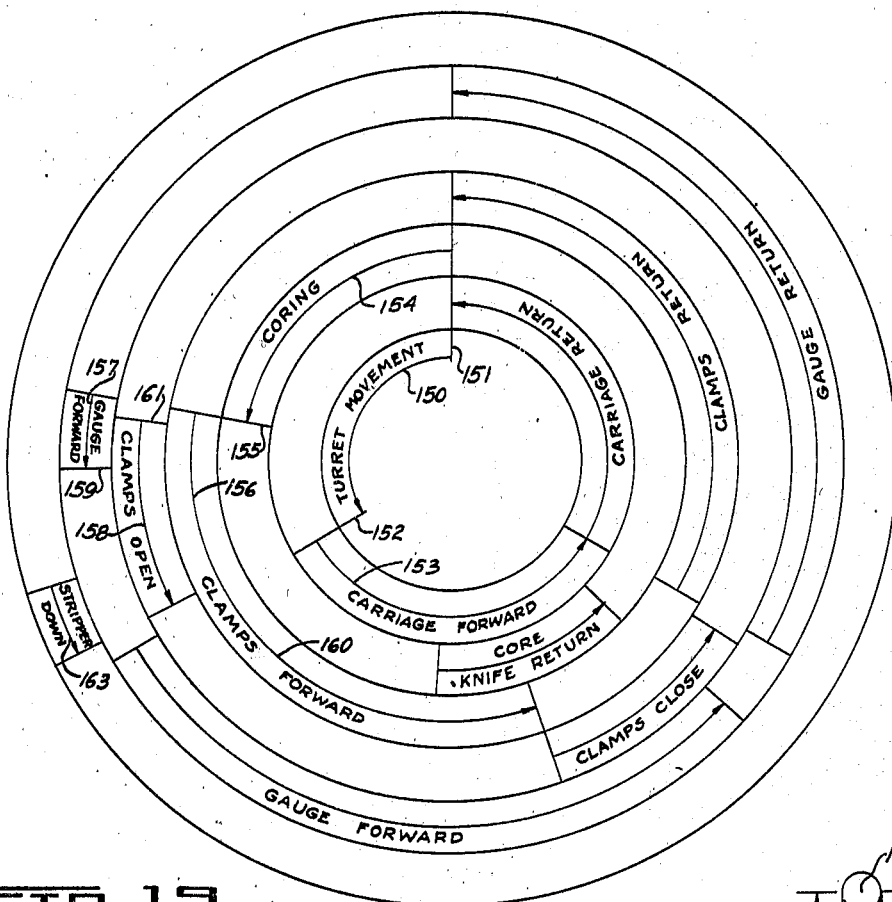
Fig_13_
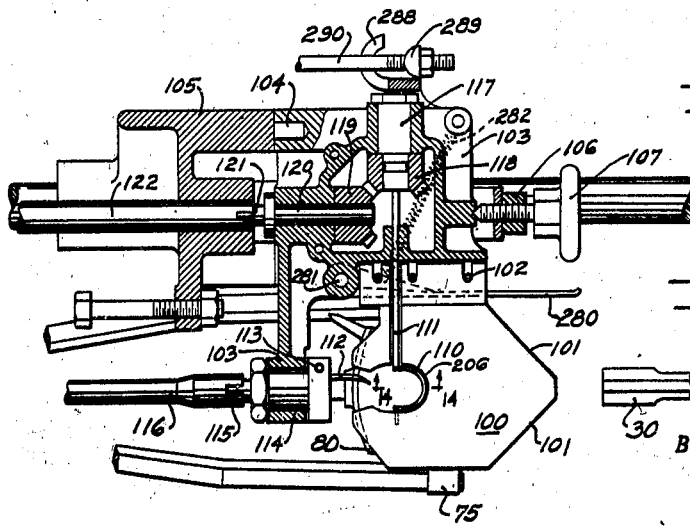
Fig_17_
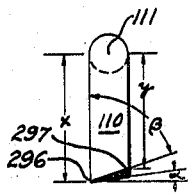
Fig_16_
INVENTOR.
ALBERT R. THOMPSON
BY
ATTORNEY Patented Feb. 29, 1944

2,343,098

UNITED STATES PATENT OFFICE 2,343,098

PEAR PREPARATION MACHINE

Albert R. Thompson, Los Gatos, Calif., assignor to Food Machinery Corporation, San Jose, Calif., a corporation of Delaware Application July 22, 1940, Serial No. 346,690

14 Claims. (Cl. 146—33)

This invention relates to machines for preparing fruit, more especially pears, for canning.

In preparing pears for canning, a series of operations are performed: the butt of the pear is trimmed; the skin is peeled off; the stem is removed; the pear is split in half; and the calyx and core are removed.

The principal object of this invention is to provide an improved mechanism for removing the core of the pear.

Specifically, it is the object of this invention to provide mechanism for cutting the core out of a pear after it has been split in half and to utilize this same mechanism to remove the cut-out core from the pear halves.

In the drawings:

Fig. 2 is an elevation of the rear end of the machine taken in the direction of the arrows 2—2 in Fig. 1, the cover of the transmission case having been removed.

Fig. 3 is a fragmentary vertical longitudinal section through a part of the mechanism employed in the coring operation.

Fig. 4 is a horizontal section therethrough.

Fig. 5 is a transverse section taken on the line 5—5 in Fig. 4.

Fig. 6 is a fragmentary section taken on the line 6—6 in Fig. 5.

Fig. 7 is a horizontal section through the coring knife restoring mechanism.

Fig. 8 is a vertical section thereof taken in the direction of the arrows 8—8 in Fig. 7.

Fig. 9 is a diagram to illustrate the location of the core in a short pear.

Fig. 10 is a side elevation of the mechanism disclosed in Fig. 8 taken in the direction of the arrows 10—10.

Fig. 11 is a diagram of the location of the core in a long pear and illustrates the position of the coring knife and other parts at the beginning of the coring operation, the splitting blade and the coring knife being shown in section.

Fig. 12 is a diagrammatic view similar to Fig. 11 illustrating the position of the coring knife and other parts during the initial part of the coring operation.

Fig. 13 is a diagrammatic view similar to Figs. 11 and 12 illustrating the position of the coring knife and other parts during the final part of the coring operation.

Fig. 14 is a diagrammatic view similar to Figs. 11 to 13 illustrating the position of the parts and especially the coring knife at the conclusion of the coring operation.

Fig. 15 is a timing diagram.

Fig. 16 is an enlarged section of the coring knife taken as indicated by arrows 14—14 in Fig. 15.

Fig. 17 is a vertical longitudinal section through the coring mechanism.

Figure 1:
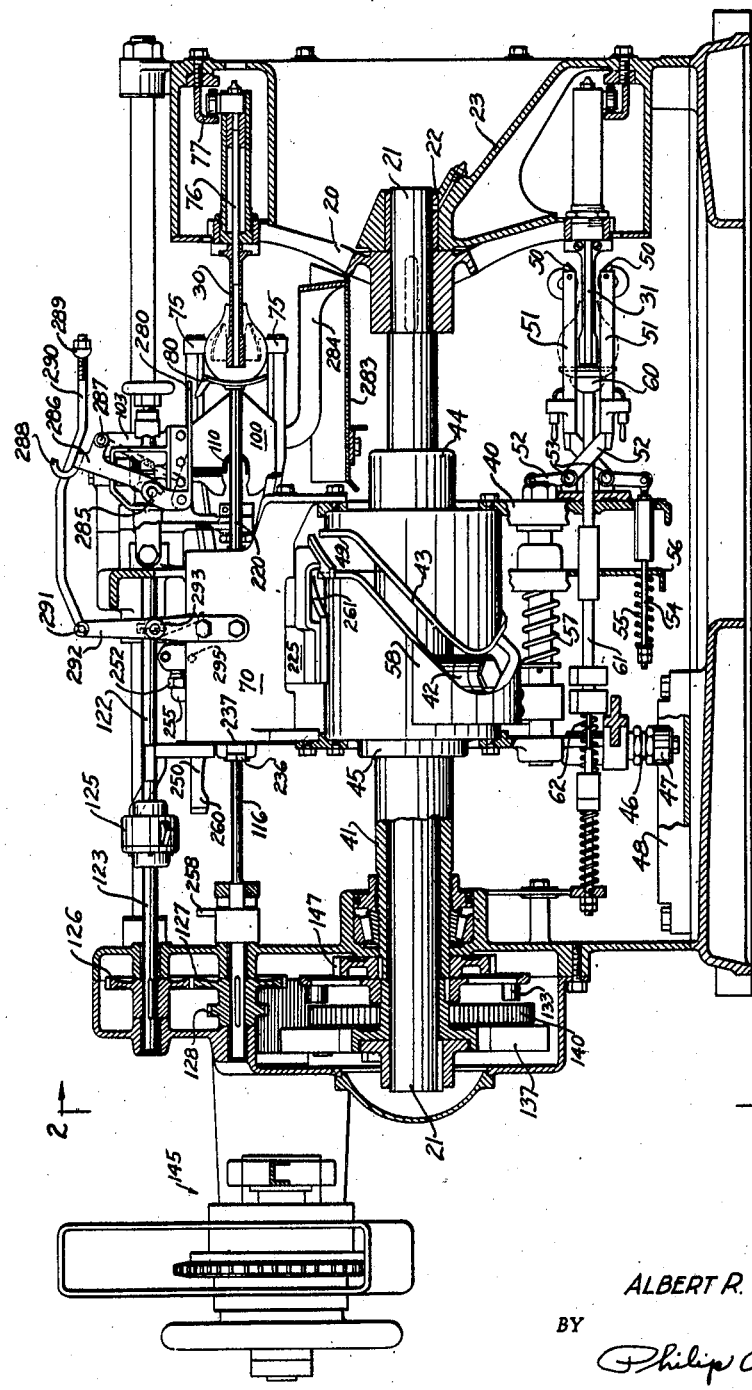
Fig. 1 is an assembly view of a pear preparation machine in which the invention has been embodied for purposes of disclosure. The view is a vertical longitudinal section with some of the parts in elevation.

The invention will be disclosed as embodied in a machine similar to that shown in the patents to Thompson et al., 2,139,704, issued December 13, 1938, and Thompson 2,154,789, issued April 18, 1939, to which reference is to be had for a complete and detailed description of an entire machine of this type. To facilitate an understanding of the present invention, however, the general construction and operation of the basic machine will be given, and, wherever portions of that machine form the immediate environment of parts of the invention, such portions will, for convenience, be described in some detail in order to make clear the cooperative relationships which exist between the new, improved mechanisms and those mechanisms which are to be found disclosed in the above-entitled patents.

Although the construction and operation of the pear preparation machine as a whole is rather complex, it will simplify an understanding thereof to bear in mind that the two principal actuating means are an intermittently-rotated turret 20 (Fig. 1) and an intermittently-reciprocated carriage 40. The turret 20 is keyed to the end of a shaft 21 having a bearing 22 in a casting 23 which forms part of the framework of the machine. The shaft 21 extends longitudinally through the center of the machine from the front end to the rear end. Adjacent the rear end of the shaft 21 a sleeve 41 is rotatably mounted thereon. The sleeve 41 is constantly rotated, and it has projecting radially from the front end thereof a driving pin 42, which causes the reciprocation of the carriage 40 by engagement with a cylindrical cam way 43 which is an integral part of the carriage 40 and has a bearing 44 at its front end on shaft 21 and a bearing 45 at its rear end on sleeve 41, which bearings permit the carriage 40 to reciprocate axially with respect to shaft 21 and sleeve 41. The carriage is prevented from rotating with respect thereto by means of a pin 46 having a roller 47 thereon, which engages with the side walls of a straight-line guide 48 secured to the base of the machine. The camway 43 has a rest portion 49 so that when the driving pin 42, which is constantly rotated by the sleeve 41, enters the portion 49 in the camway, it does not cause reciprocation of the carriage 40. It is during this rest period of the carriage 40 that the turret 20 is rotated by means of shaft 21, which is at rest during reciprocation of the carriage 40.

The pears are impaled on hollow stemming tubes 30, 31 mounted on the turret 20. There are six of these stemming tubes arranged in a circle around the axis of the turret, although for purposes of clarity, only two are shown in Fig. 1. These tubes are equally spaced apart, the stemming tube which appears at 30 in Fig. 1 being the tube which, at the moment, is at the top of the circle, and the stemming tube 31 is the one at the bottom thereof. Each time the turret 20 is rotated one-sixth of a turn, the stemming tubes are moved from one position to the next, so that, for example, the stemming tube 30 (Fig. 1) would be moved toward the reader and a similar stemming tube carrying another pear would be brought into the same position now occupied by the stemming tube 30.

Opposite these six rest positions of the stemming tubes are various instrumentalities mounted in the carriage 40 for performing the different operations on the pears, so that upon each reciprocation of the carriage 40, six operations are performed simultaneously. As shown in Fig. 1, the carriage 40 is reciprocating and has just arrived at the forward end of its stroke. The pear, which is impaled on the stemming tube 30 at the top, is about to be subjected to the final operation of removing the stem, splitting the pear in half, and then removing the core and calyx. This is the last operation of the machine. At the same time that this is taking place, the pears on the four stemming tubes following the stemming tube 30 are being peeled.

The stemming tube 31, which appears in Fig. 1, is the third tube following the stemming tube 30, and the pear thereon is about to undergo a peeling operation by two arcuate knives 50 mounted in the ends of a pair of yokes 51 carried by two bell cranks 52 which have pivots 53 on the front of the carriage 40. In the position shown, the outer ends of the bell cranks 52 are being resiliently urged rearward, so as to cause the knives 50 to engage the pear. For this purpose there is pivotally connected to each bell crank a pull rod 54 which is operated through a compression spring 55 abutting a plate 56. The plate 56 is normally urged forward by spring 57 but as shown in Fig. 1 it has been moved rearward by the driving pin 42 engaging with auxiliary cam 58, which cam is independent of the cam way 43 and is connected to the plate 56. As the driving pin 42 continues to rotate from the position shown in Fig. 1, it will draw the carriage 40 rearwardly and thus cause the knives 50 to be drawn over the surface of the pear, the knives being held resiliently in engagement therewith by reason of the pin 42 riding on the cam 58 and the plate 56 compressing the springs 55.

To prevent the paring knives 50 from drawing the pear off the stemming tube 31, the butt stop 60 is employed. The butt stop 60 is made in two parts, consisting of a small center piece and an encircling flange or cup. The latter part is withdrawn from engagement with the butt of the pear after the paring knives 50 have passed over the bell of the pear and start to descend the butt in order to uncover the butt of the pear for peeling, there being no danger of the knives 50 tending to remove the pear from the stemming tubes after they start to descend the butt. For this purpose the cup part of the butt stop is secured to the end of a tube 61 and the center part is secured to the end of a rod 62 which passes through the tube. Means are provided for withdrawing the tube 61 and its cup at the proper time to permit passage of the paring knives 50, and at the end of the rearward stroke of the knives another means withdraws the rod 62 to withdraw the center part of the butt stop so that the pear is free for movement by the turret to the next position.

The skin of the pear is not completely removed by one stroke of the paring knives 50 but by the successive strokes at the different stations. Upon each reciprocation of the carriage 40, all four sets of paring knives, being mounted for movement with the carriage, execute a reciprocatory stroke, during the return part of which the paring knives are drawn over the pears, removing strips of peeling therefrom.

At the final station, which in Fig. 1 is the station opposite which the stemming tube 30 is positioned, the reciprocatory movement of the carriage 40 is utilized to remove the pear from the stemming tube, split it in half, and position it for removal of the core and calyx. For this purpose, there is rigidly secured to the top of the carriage 40 a cylindrically-shaped housing 70 which contains mechanism for operating clamps 75. At the end of the forward reciprocatory stroke of the carriage 40 and housing 70, which moves therewith as an integral part thereof, the clamps 75, which are carried by the housing 70 and are controlled in their movement by mechanism therein, are caused to grasp the pear on the stemming tube 30, as shown in Fig. 1. There are four of these clamps 75, but the two nearest the reader were removed in order to clarify the disclosure in Fig. 1. The pear now has passed through the four peeling stations and has had all of its skin removed. The purpose of the clamps 75 is to remove the pear from the stemming tube upon the rearward movement of the carriage. When the pear is drawn off the stemming tube 30 by the clamps 75, the stem of the pear remains within the hollow stemming tube 30, and this stem portion is subsequently ejected from the stemming tube by an ejector plunger 76 controlled in its operation by a fixed camway 77 upon rotation of the turret 20.

In addition to the clamps 75, two gauge plates 80 are carried by the housing 70 and are moved forward therewith in the forward stroke of the carriage 40 and placed against the butt of the pear. Then, upon rearward movement of the carriage, the clamps 75 and the gauge plates 80 move rearward, holding the pear in their grasp. As the pear is carried by these holding means during the rearward stroke of the carriage 40, it is split in half by a stationary blade 100, which has a V-shaped cutting edge at its front end. This knife can be seen in Fig. 17, the cutting edges being indicated at 101. In Fig. 17, the clamps 75 and the gauge plates 80 are in the positions they occupy at the end of the rearward stroke of the carriage, in which positions they remain, holding the pear halves for the coring operation. It is to be understood that for clarity in Fig. 17, the two clamps 75 and the gauge plate 80, which are on the side of the splitting blade toward the reader, have been omitted to expose the blade 100 and the mechanism associated therewith.

The stationary splitting blade 100 is secured at 102 in a removable sub-frame 103, which is positioned by means of dowels 104 on a part 105 of the framework of the machine. The sub-frame 103 is held in place by means of the clamping yoke 106, so that when the screw 107 is loosened, the yoke 106, which is pivoted to the frame part 105, can be swung out of the way to permit removal of the sub-frame 103 and the parts mounted therein. This is to facilitate replacement of knives.

The coring knife 110 is an arcuate blade formed integrally at the foot of a slender vertical shaft 111. When the shaft 111 is rotated, the arcuate blade 110, which normally lies in the plane of the splitting blade 100, swings around and cuts the core out of the pear halves. At the same time another knife 112 cuts out the calyx.

The means for operating the coring knife and the calyx knife will now be described. The calyx knife 112 is removably mounted by means of a set screw 113 in the end of a stub shaft 114 journalled in the sub-frame 103. The stub shaft 114 has a tongue-and-groove connection 115 with the shaft 116 journalled in the frame of the machine.

The vertical shaft 111, which rotates the coring knife 110, is secured in a stub shaft 117, which is journalled in the sub-frame 103. A bevel gear 118 is secured to the stub shaft 117 and is driven by a bevel gear 119 secured to a stub shaft 120 journalled in the sub-frame 103. The stub shaft 120 has a tongue-and-groove driving connection 121 with a shaft 122 journalled in the frame of the machine.

The means for driving the calyx knife drive shaft 116 and the coring knife drive shaft 122 will now be described by reference to Fig. 1. The shaft 122 is in alignment with the shaft 123 and is connected thereto by means of a pawl and ratchet clutch 125, the function of which will be explained later. Shaft 123, which is journalled in the frame of the machine, has keyed thereto a gear 126, which is driven by a gear 127 having a common hub with a pinion 128. The hub of these two gears is keyed to the calyx knife drive shaft 116.

Referring now to Fig. 2 where these gears may be seen in elevation, the pinion 128 is driven by gear 130, which has secured thereto a modified Geneva wheel 131 having four slots 132 formed therein. Driving pins 133 are adapted to enter the slots 132 and rotate the gear 130. The sides of each slot 132 are not straight and parallel throughout, but as they approach the periphery of the modified geneva 131, they communicate with arcuate surfaces 134 and 135. The modified geneva 131 is rotated in the direction of the arrow placed thereon, and the driving pin 133, which is shown in Fig. 2 as entering a slot, has passed freely by arcuate surface 135. As the driving pin 133, of which there are six, continues to rotate clockwise from the position shown in Fig. 2, it will enter the slot 132, causing rotation of the modified geneva 131 and then leave the slot 132, and as soon as it encounters the arcuate surface 134 it will cease to rotate 131, because arcuate surface 134 will then be concentric with the axis of rotation of the driving pin 133. This axis is the axis of shaft 21, with which shaft the wheel 136, upon which the six driving pins 133 are mounted, rotates.

The wheel 136 is secured to the hub of Geneva wheel 137, which is keyed to shaft 21. Geneva 137 has six slots 138 into which driving pin 139 on gear 140 enters. Geneva 137 is provided with arcuate surfaces 141 with which a ring 142 moves into locking engagement after the driving pin 139 leaves a slot 138. Gear wheel 140 is driven by pinion 144 on power shaft 145. Integrally secured to the gear 140 is a gear 146, which engages with a gear 147 for operating the carriage, which will be explained later. The power shaft 145 is constantly rotated from a source of power not shown, which is usually a motor mounted directly on the machine. The pinion 144 causes rotation of the gear 140 in the direction of the arrow placed thereon at a constant speed. During each revolution of the gear 140 the machine completes a cycle of operations; that is, the various instrumentalities mounted on the carriage and the coring and calyx knives complete their cycle of operation during one revolution of the gear 140.

To facilitate an understanding of the sequence of these various operations, the timing diagram in Fig. 15 illustrates the time and duration of the various operations with respect to rotation of the gear 140. For example, the arrow 150 represents the time of movement of the turret 20, and this movement begins at the top vertical radius 151 in Fig. 15, which may be taken as the zero degree or beginning of the cycle. This position corresponds to the position of the parts shown in Fig. 2, where the driving pin 139 is just entering slot 138 and starting to rotate geneva 137. It will be recalled that geneva 137 is keyed to the rear end of the shaft 21, and that the turret 20 is keyed to the forward end, so that as the gear 140 rotates from the position shown in Fig. 2, its driving pin 139 will enter and then leave slot 138, causing the 60° rotation of geneva 137 and a corresponding angular movement of the turret 20; that is, one-sixth of a turn, there being six stemming tubes on the turret. This movement occupies approximately 120° rotation of gear 140 and accordingly, on the timing diagram in Fig. 15, the turret movement indicated by the arrow 150 is shown as ending at 152.

It is at this same point that the carriage starts to move forward, as indicated by the arrow 153. It will be recalled, by reference to Fig. 2, that the gear 146 drives the gear 147. As can be seen in Fig. 1, the gear 147 is keyed to the rear end of the sleeve 41, which, at its forward end, carries the driving pin 42, which engages in the cam way 43 to cause reciprocation of the carriage 40. This driving pin 42 is therefore constantly driven in synchronism with the gear 140, and from position 151 to position 152 in Fig. 15, the driving pin 42 was travelling in the rest portion 49 of the cam way 43 (Fig. 1). At the point 152 (Fig. 15) the pin 42 enters the cam way proper and starts the forward reciprocation of the carriage 40. As shown by the diagram in Fig. 15, the carriage moves forward and then returns, the end of the return movement occurring at 151. The timing diagram illustrates what was stated preliminarily, and that is that the turret and carriage movements are intermittent and alternate in each cycle of operation.

It will be noted by the position of the arrow 154 (Fig. 15) that the coring takes place during the forepart of the turret movement, and while the carriage is at rest. Referring to Fig. 2, it will be noted that the moment the driving pin 139 starts to drive the geneva 137, the driving pin 133 starts to drive the modified geneva 131, which, through the train of gears 130, 128, 127, 126 causes the calyx knife drive shaft 116 and the coring knife drive shaft 123 to begin rotating. This instant is on the vertical radial line 151 in Fig. 15, so that the arrow 154 begins at that point. The reason the coring ceases before the turret stops rotating is that when the drive pin 133 in Fig. 2 encounters the arcuate surface 134 of the slot in the modified geneva 131, the train of gears to the shafts 116 and 123 stops moving, although the driving pin 133 and the geneva 137 continue their movement. Accordingly, the terminal line 155 in Fig. 15, which marks the end of the arrow 154, corresponds to the moment when the drive pin 133, in leaving the slot 132, encounters the arcuate surface 134.

The relative size of the gears 128 and 130 in Fig. 2 is such that for each partial rotation of the modified geneva 131, the calyx knife drive shaft 116 performs one complete revolution. The gear 126 is smaller than the gear 127. The relative size of these gears is such that for each complete revolution of the calyx knife drive shaft 116, the coring knife drive shaft 123 performs one and one-eleventh revolutions, which brings the coring knife 110 to rest in the position shown in Fig. 14.

The starting position of the coring knife 110 is shown in Figs. 11 and 17, where it lies in the plane of the splitting blade 100, so that in Fig. 14 the starting position of the coring knife 110 would be at the point indicated at 200. From the starting position 200 (see Fig. 11) the coring knife 110 rotated clockwise one and one-eleventh revolutions and came to rest in the position shown in Fig. 14. When the pear was withdrawn from the stemming tube by the clamps 75 and gauge plates 80, it was carried rearwardly by the rearward movement of the carriage and was split in half by the splitting knife 100, so that when the coring knife 110 performed its operation it first cut a core half 201 out of pear half 202 and then cut core half 203 out of pear half 204 see Figs. 12 and 13 respectively.

After the coring knife comes to rest in the position shown in Fig. 14, which occurs at the time indicated by the radial line 155 in Fig. 15, the gauge plates and clamps will move forward, as indicated by the arrows 156 and 157 in Fig. 15, and after a slight forward movement the clamps will also begin to open, as indicated by the arrow 158. The forward movement of the gauge plates ends at the time indicated by the radial line 159, and the positions occupied by the gauge plates and clamps at this time are indicated in broken lines in Fig. 14, where it will be seen that the gauge plates 80 have moved forward and the clamps 75 have moved forward and then outward. This movement of the gauge plates and clamps is utilized to dislodge the core halves. The gauge plates 80, in moving forward, urge the pear halves 202, 204 forward and disengage them from the core halves 201, 203. This result is made possible by the special action of the coring knife, which will now be described.

If the coring knife 110 (Fig. 14) had a simple flat curved blade and was rotated from the point 200 in the plane of the splitting blade 100 through 360° back to the point 200, then when the pear holding means released the pear the core halves would tend to cling to the pear halves on account of the cohesion between the core and its pocket in the pear. This would require that the pear halves be subjected to an additional operation to remove the core halves which had clung in their pockets. Such an operation would be tedious and expensive. It was to obviate resort to this additional operation that I conceived the idea of utilizing the coring knife itself in conjunction with the gauges to cause separation of the cores and halves at the conclusion of the coring operation.

The blade of the coring knife 110 is constructed as shown in Fig. 16. The cutting edge 296 is given a clearance angle $\alpha$ and a back slope angle $\beta$. The heel 297 is located a distance $y$ from the coring knife axis 111, and the cutting edge 296 is located a distance $x$. $\beta$ is an acute angle and $x$ is greater than $y$.

With this blade construction the heel has a dragging effect on the core so that in Fig. 12 as the knife finishes cutting the core half 201 from the pear half 202 the heel of the blade in exerting its drag on the core half causes the core half 201 to be turned in its pocket (see Fig. 13). Likewise, when the blade finishes cutting out the core half 203 (see Fig. 14) the heel causes the core half 203 to be turned in its pocket so that the edge 205 of the core half is drawn into or beyond the plane of the splitting blade.

The coring knife is caused to rotate beyond the 360° point 200 (see Fig. 14) and is brought to rest in the position shown where it engages the core half 201.

Now when the clamps 75 move forwardly and open they release their hold upon the pear halves 202, 204 and simultaneously the gauge plates 80 move forwardly. The core half 203 strikes the edge 206 of the splitting blade 100. As can be seen in Fig. 17, this is the front edge of the aperture provided in the splitting blade for the accommodation of the coring knife 110. The knife itself snares the core half 201 (Fig. 14). The clamps 75 being open, the pear halves 202, 204 are free to open or fall away from the splitting blade and separate from the core halves which are caught on the edge 206 and the knife 110.

The mechanism for operating the gauge plates 80 and clamps 75 will now be described. One of the functions of the gauge plates 80 is to position the pear with respect to the axis 111 (Figs. 9 and 11) of the coring knife so that upon rotation of the coring knife the core of the pear will be removed. The location of the core in pears varies. For example, in Fig. 9 is shown a short pear 210 in which the core 211 is located relatively close to the butt end 212, whereas in the long pear 213 shown in Fig. 11, the core 214 is located substantially in the center of the bell 215. Accordingly, means are provided whereby the gauge plates 80 can be adjusted in order to position the pear so that the axis 111 of the coring knife will be at the center of the core.

In Fig. 4 it will be noted that the gauge plates 80 are secured to the ends of rods 220. Each of these rods is supported in an aperture 221 in a plate 222 which constitutes the front end enclosure of the housing 70, which, it will be recalled, is secured to the carriage 40. Each rod is also supported in an aperture 223 in a supporting arm 224 formed as an integral part of a spider 225, which can be seen in end elevation in Fig. 5. The rear ends of the rods 220 are interconnected for movement in unison by means of an inverted U-shaped yoke 230 (Fig. 5), each leg of the yoke having a bearing portion 231 (Fig. 4) at the foot thereof apertured to receive the rod 220. A set screw 232 (Figs. 3 and 6) is threaded into each bearing portion 231 to engage in either the holes 233 or 234 in the rods 220. To adjust the gauge plates 80 for short pears, as in Fig. 9, the set screws 232 are engaged with holes 233; and for long pears, as in Fig. 11, with holes 234. These constitute master adjustments, there being a finer adjustment for finer variations of the location of the center of the core in the pear, as will be explained presently.

The rods 220 (Fig. 4) are capable of axial shifting with respect to the housing 70. Their forward movement is limited by a means which will now be described. The rear end of each rod 220 is threaded into a sleeve 235 which has a hexagonal head 236 for purposes of adjustment. The sleeve 235 passes through an aperture in the end of the housing 70 and through an aligned aperture in the plate 237, which is secured to the end wall of the housing 70. When the gauge plates 80 are freed for forward movement springs 238 cause the rods 220 to slide forwardly with respect to the housing 70, until the hexagonal heads 236 contact the plate 237.

The spider 225 also has a reciprocatory movement with respect to the housing 70. It is journalled on a sleeve 240 which has a flanged head 241 seated in the front wall 221 of the housing and is threaded through the rear wall of the housing at 242 and secured with a nut 243. The calyx knife drive shaft 116 passes freely through the sleeve 240. A spring 244 interposed between the rear wall of the housing and a shoulder on the spider 225 urges the spider forwardly. As shown in Fig. 3, the spider 225 is in its extreme forward position in the housing 70 where it abuts the plate 222. When the housing 70 is moved forward with the carriage, the head of the screw 245, which is threaded into the framework of the machine at 246, engages the end 247 of a latch 250 pivoted at 251 to the spider 225, thus arresting forward movement of the spider. After the spider's forward movement is arrested by the stop 245, the carriage carries the housing onward in its forward movement so that the sleeve 240 slides through the spider 225, compressing the spring 244. Near the end of the forward movement of the housing 70 the head of an adjusting screw 252, which is threaded into a split arm 253 (Fig. 5) of the spider 225 and held in adjusted position therein by the clamping screw 254, engages the top portion 255 (Fig. 3) of the yoke 230, thereby arresting the forward movement of the rods 220 and gauge plates 80, these parts having been carried forward with the forward movement of the housing 70. Continued forward movement of the housing 70 results in moving the plate 237 (Fig. 4) away from the heads 236 of the adjusting sleeves 235, so that the parts finally arrive at the relative positions illustrated in Fig. 4 at the end of the forward stroke of the carriage.

The spider is latched in this position by means of the shoulder 256 (Fig. 3) on latch 250, engaging the outside of plate 237. The rear end of latch 250 is guided in a slot 257 in the plate 237. Fig. 4, illustrating the position of the parts at the end of the forward stroke of the carriage, shows the gauge plates 80 at the position they occupy when they engage the butt end of the pear for removal of the pear from the stemming tube, and, as explained before, the gauge plates remain in contact with the pear during the return stroke of the carriage as the pear is carried back to the position in which the core will be removed, which position is the position illustrated in Fig. 17 where the carriage has arrived at the rear end of its stroke, and where it remains at rest while the coring knife 110 and the calyx knife 112 perform their operations.

The screw 252 (Fig. 3) constitutes the fine adjustment of the gauge plates 80. In practice the screws 232 are used for the master settings of the gauge plates, depending on the general type of pear being handled, and then to meet the variations in location of the core center in any particular lot of pears the screw 252 is employed to obtain an accurate adjustment of the gauge plates 80 so that the axis of the coring knife will be located at the center of the core.

The coring operation takes place while the carriage 40 (Fig. 1) is at the rear end of its stroke, so that the end 260 of the latch 250 is at this time positioned in the path of a rotating cam 258. At the end of the rotation of the calyx knife drive shaft 116, the cam 258, which is secured for rotation with the shaft 116, engages the end 260 of the latch 250, lifting the latch to disengage the shoulder 256 (Fig. 3) from the plate 237, thus freeing the spider 225.

The spider 225 is not, however, allowed to spring forward under the influence of spring 244. Its forward movement is controlled by means of a cam way 261 indicated in dotted lines in Fig. 4, which is secured to the bottom of the spider 225, as shown in Fig. 5. At the moment the cam 258 (Fig. 1) releases the latch 250, the driving pin 42 is at top dead center and at the entrance of the cam way 261, so that as the driving pin 42, which is constantly rotating, passes out of top dead center, it controls the forward movement of the spider 225 by its engagement with the cam way 261.

The arms of the clamps 75 are pivotally secured to the spider 225. The connections of the four clamp arms to the spider can be seen in Fig. 5. One of these clamp arms is indicated at 262, where it is received in a pair of ears 263 formed on the spider 225 and pivoted therein by means of a screw 264. The side elevation of one of these mountings appears in Fig. 6. Because of this construction the reciprocatory movement of the clamps corresponds to the reciprocatory movement of the spider 225. However, in addition to reciprocating, the clamps open and close in order to grasp and release the pears. The opening and closing of the clamps is effected by the structure shown in Fig. 6, where it will be seen that a ledge 265 is provided on the housing end plate 222 with which an inclined surface 266 of the clamp arm is adapted to contact. As shown in Fig. 6, the clamp is closed and in engagement with the pear, so that there is a space intervening the ledge 265 and the inclined surface 266. When the spider is unlatched at the end of the coring operation, it moves forward in the housing 70, causing the clamps to be moved forward until the inclined edge 266 of each clamp arm engages the ledge 265. Thereafter, forward movement of the spider 225 results in a camming action between the inclined edge 266 and the ledge 265, which causes the clamps to open, the clamp arms swinging outwardly from the pear. It will be recalled that the forward movement of the spider 225 is positively controlled by the driving pin 42 engaging in the camway 261 attached to the spider, so that as the spider 225 is moved forwardly in the housing 70, the outer side 267 of the inclined portion of the clamp arm forces a plunger 268 rearwardly against the action of its spring 269. The plunger 268 is slidably mounted in an aperture 270 provided therefor in the housing 70.

When the carriage arrives near the forward end of its stroke, the clamps are fully opened in order to pass over the pear which is on the stemming tube. It is at this time that the stop 245 (Fig. 3) arrests the spider 225, so that as the housing 70 continues its forward movement to the end of the stroke the plungers 268 (Fig. 6) are resiliently urged against the inclined surfaces 267 of the clamp arms in order to resiliently press the clamps into engagement with the pear. As soon as each clamp comes to rest on the pear surface the closure of the clamp ceases, because, as shown in Fig. 6, continued forward movement of the housing 70 merely results in opening the gap between the inclined surface 266 and the ledge 265. The pressure angle between the plunger 268 and the inclined surface 267 is such that the plunger 268 will resist any outward movement of the clamp arm which would tend to cause the clamp to lose its grip on the pear, and this arrangement serves to resiliently bring the clamps into engagement with the pear and then lock them against opening from this position. When the clamps are finally opened at the end of the coring operation, the plungers 268 are forced back by the positive camming action of the inclined surface 266 on the ledge 265 when the spider 225 is positively moved forward.

The timing of the operation of the gauges and clamps will now be described with the aid of the diagram in Fig. 15, wherein it will be recalled that the end of the coring operation occurred at the time indicated by radial line 155. This is also the time at which the calyx knife drive shaft 116 (Fig. 1) completes its revolution and the cam 258 lifts the end 260 of the latch 250, releasing the spider 225, which is then moved forward by engagement of the pin 42 with the cam way 261. This causes the gauges to move forward, as indicated by the arrow 157 (Fig. 15) and also causes the clamps to move forward, as indicated by the arrow 160.

At the time indicated by the radial line 161, the clamps begin to open, and this is the instant when the inclined edge 266 (Fig. 6) comes into contact with the ledge 265, the time from radial line 155 to radial line 161 in Fig. 15 being the time required for the spider 225 (Fig. 6) to move forwardly a distance sufficient to close the gap between the clamp arm and the ledge. The gauges move forward as indicated by the arrow 157, at the same time that the clamps move forward, because the yoke 230 (Fig. 1) which connects the gauge rods 220, was in engagement with the adjusting screw 252 on the spider 225. Therefore, the gauge plates 80 move forward with the clamps 75 until the heads 236 contact the plate 237. This is the instant when the forward movement of the gauge plates is arrested and is indicated by the radial line 159 in Fig. 15. After the gauge plates are arrested the clamps continue their forward movement, as indicated by the arrow 160, and continue opening, as indicated by the arrow 158.

These timed operations produce the result illustrated in Fig. 14, where the gauge plates move forwardly from their full line positions to their broken line positions, and at the same time the clamps move forwardly from their full line positions and then forwardly and outwardly to their broken line positions, so that the clamps release the pear halves 202, 204 and the gauge plates push the pear halves forwardly to disengage them from the core halves 201, 203.

In order to further disengage the pear halves, a stripper comes into action, as indicated by the arrow 163 in Fig. 15. The stripper consists of a pair of plates, one of which is shown at 280 in Fig. 17, one of these stripper plates being disposed on either side of the splitting blade 100. They are pivoted at 281 in the sub-frame 103 and are normally held in the position shown by means of a spring 282. At the time indicated by the arrow 163 (Fig. 15) the stripper plates 280 are swung downwardly to assist in removing the pear halves from the splitting blade 100.

The pear halves drop into a trough 283 (Fig. 1) from which they are discharged by an ejector 284. The stripper plates 280 are in the form of bell cranks, the upstanding arms of which have a pin-and-slot connection 285 with bell cranks 286 pivoted at 287 to the sub-frame 103. The bell cranks 286 carry jaws 288 with which engages a head 289 on the end of a rod 290, the rear end of which is pivotally connected at 291 with a lever 292 pivotally supported in a bracket 293 (Fig. 5) which is secured to the housing 70. The lower end of the lever 292 is disposed in the path of the pin 295 secured to the spider 225. The position of the pin 295 is indicated in dotted lines in Fig. 1, and its location is such that as the spider 225 approaches the forward end of its movement in the housing 70, it oscillates the lever 292 counterclockwise (Fig. 1) thus drawing the rod 290 rearwardly. In the position of the parts shown in Fig. 1, this does not result in actuation of the stripper mechanism, because the carriage 40, being at the forward end of its stroke, the head 289 is not disposed within the jaws 288. However, when the carriage 40 is at the rear end of its stroke, the head 289 is then in cooperative relation with the jaws, as shown in Fig. 17, at which time operation of this linkage does result in deflecting the stripper plates 280 downwardly.

After the pear halves have been removed, it is necessary to restore the coring knife 110 to its position in the plane of splitting blade 100 in readiness for the next operation, and the mechanism by which this is effected will now be described. It will be recalled that the coring knife drive shaft 122 (Fig. 1) was connected to the shaft 123 through a clutch 125. This clutch is shown in detail in Figs. 7 and 8. The clutch housing 300 is connected by a key 301 and a set screw 302 to the end of the coring knife drive shaft 122, and for purposes of assembly it has secured thereto a member 303 which, in effect, forms an integral part of the housing 300. It is positioned thereon by means of an annular tongue-and-groove 304 and removably secured thereto by screws 305. The member 303 is provided with a bearing surface 306 on the hub of a ratchet wheel 307 connected by a key 308 to the shaft 123.

Slidably mounted in a slot 310 formed in the housing 300 is a pawl made in two parts 311, 312 having a spring 313 interposed between them to normally urge them apart. The part 311, being urged outwardly in the slot 310 by the spring 313, is limited in its outward movement by engagement of a shoulder 314 thereon with the end of shaft 122, and its movement in the opposite direction, that is, inwardly with respect to the slot 310, is limited by a shoulder 315, which also engages the end of shaft 122. The part 312 has formed integrally therewith the tooth 316, which the spring 313 urges into engagement with the teeth of the ratchet, as can be seen in Fig. 8.

Normally, the shafts 122, 123 are connected together in driving relationship by reason of the fact that the spring 313 maintains the shoulder 314 of part 311 against the end of shaft 122 and also maintains the tooth 316 in engagement with the ratchet 307. When the coring knife 110 (Fig. 11) is in its initial position at 200, where it lies in the plane of the splitting blade 100, the pawl 311, 312 is in the dot-and-dash line position indicated at 317 in Fig. 8. When the shaft 123 is rotated it causes rotation of the shaft 122, by reason of the engagement of the tooth 316 in the ratchet 307, for one and one-eleventh revolutions in the direction of the arrow 318 (Fig. 8) so that when the coring knife has finished its operation and comes to rest in the position shown in Fig. 14, the pawl 311, 312 is in the full line position indicated in Fig. 8. It is now necessary to disengage the pawl from the ratchet and restore it to its starting position at 317.

This is effected by means of a V-shaped member 320, which is welded to the plate 237, which, it will be recalled, is secured to the rear end of the housing 70. This member 320 has two vertically extending cam arms 321, 322. The arm 321 has formed integrally therewith a horizontally disposed cam piece 323 (Fig. 7), the nose 324 of which strikes the inclined surface of the end of pawl part 312, camming it inwardly as the carriage moves forwardly, the carriage moving in a direction parallel to the axis of the shafts 122, 123. When the part 312 is cammed inwardly, the tooth 316 is withdrawn from engagement with the teeth of the ratchet 307. During the continued forward movement of the carriage the side 325 of the cam holds the tooth 316 out of engagement with the ratchet, and during this time a cam 326 (Fig. 10), which is secured to cam arm 322, engages the projecting end of the pawl part 311 and cams it upwardly, as seen in Fig. 10, or, as seen in Fig. 8, causes the pawl to be rotated clockwise in the direction of arrow 327. As soon as the tooth 316 has been moved over the top of the adjacent tooth of the ratchet 307, the spring 313 tends to draw it into the next tooth space, so that the cam 326 serves to rotate the pawl far enough to get it started into the next tooth space. When the cam 326 rotates the pawl it also rotates the clutch housing 300 and therefore causes a one-eleventh rotation of the coring knife drive shaft 122, thus restoring the coring knife 110 to its starting position.

When the carriage returns, the cam 326 clears the pawl part 311 which is in position 317 (Fig. 8) and the cam 323 clears the pawl part 312. When the carriage arrives at its rearward position the cams are behind the clutch as shown in Fig. 3. The pawl is made in two parts 311, 312 urged apart by the spring 313 as a safety measure to prevent breakage of the clutch parts if the machine should be accidentally operated with the coring knife drive shaft out of time.

While I have described a particular embodiment of the present invention, it will be obvious that various changes and modifications may be made in the details thereof without departing from the spirit of the present invention and the scope of the appended claims.

Having thus described my invention and in what manner the same may be used, what I claim as new and desire to protect by Letters Patent is:

1. In a pear preparation machine having means for splitting the pear in half, a coring knife, and means for holding a split pear in position with respect to said coring knife so that upon actuation thereof the core will be cut out of the pear by said knife: an actuator for said knife adapted to leave said knife in engagement with the core after the cut, and a mechanism to release said holding means, the time of operation of said mechanism being controlled by said actuator so that the pear is released while the knife is in engagement with the core.

2. In a pear preparation machine having means for splitting the pear in half, a coring knife, and means for holding the split pear in position with respect to said coring knife so that upon actuation thereof from a starting position the core will be cut out of the pear: a main power train which is constantly driven, an auxiliary train which is intermittently driven, a drive for said knife operated from said auxiliary train, said drive setting said knife in engagement with the core when said auxiliary train comes to a stop, and cam means actuated by said main train operable upon said drive to withdraw said knife from core-engaging position and return it to starting position.

3. In a pear preparation machine having means for splitting the pear in half, a coring knife, and means for holding the split pear in position with respect to said coring knife so that upon actuation thereof the core will be cut out of the pear by said knife: a source of power, driving mechanism for actuating said knife, said driving mechanism being intermittently driven from said source of power, said driving mechanism including a clutch, said driving mechanism bringing said knife to rest in engagement with the cut-out core, a release for said holding means operated by said driving mechanism when said knife is brought to rest, a second mechanism driven from said source of power in timed relation with said driving mechanism and operated during the rest period thereof to release said clutch and withdraw said coring knife from engagement with the core.

4. In a pear preparation machine having an intermittently-reciprocated carriage, means for splitting the pear in half, a coring knife, and means for holding the split pear: a reversible shaft for actuating said knife, a driving mechanism operable during the rest period of said intermittently-reciprocated carriage, a clutch to connect said driving mechanism with said shaft, a spring-pressed gauge plate constituting an element of said pear holding means, a latch to retain said gauge plate so as to position the pear half with respect to said coring knife so that upon actuation thereof the core will be cut out of the pear by said knife, said coring knife being operably connected to said shaft so that when said shaft comes to rest said coring knife is in engagement with the cut-out core, a cam driven by said driving mechanism and operable to release said latch as said shaft comes to rest, and cam means on said carriage to disengage said clutch and rotate said shaft reversely to withdraw said knife from the core.

5. In a pear preparation machine, having a splitting blade, a rotary coring knife normally disposed in the plane of said blade, and reciprocating pear holding means adapted to draw the pear onto said blade and present the split pear to said coring knife: a drive shaft for said coring knife, a second shaft aligned therewith, a ratchet wheel on said second shaft, a pawl mounted for rotation with said drive shaft and for engagement with said ratchet, cam means mounted for reciprocation with said pear holding means and adapted to cooperate with said pawl, the initial position of said pawl corresponding to said normal position of said knife, the rotation of said second shaft serving to rotate said pawl from said initial position around to said initial position and then a fraction of a revolution beyond to its final position, said pawl in its final position being then disposed in cooperative relation with said cam means, said cam means serving to disengage said pawl from said ratchet and rotate said pawl to the initial position thereof.

6. In a pear preparation machine having a blade for splitting the pear in half, a coring knife associated with said blade and normally disposed in coplanar relation thereto, and means for holding the two halves of a split pear on opposite sides of said blades in coring position with respect to the coring knife: means for actuating said knife to cut out the core portions of said pear halves, and to bring said knife to rest in non-planar relation with said blade following said core cutting operation, whereby upon release of the pear halves from said blade the core portion of one of said halves is snared by said knife, means actuating said holding means to release said pear halves and means for returning said coring knife into co-planar relation with said blade after said pear halves are released.

7. In a pear preparation machine, a splitting blade, an arcuately formed rotary coring knife associated with said splitting blade and having a cutting edge and a heel portion, means mounting said coring knife for rotation about an axis lying in the plane of said splitting blade, pear holding means adapted to draw a pear onto said splitting blade to split the pear into halves and then position said halves on opposite sides of said knife for coring thereby, means for rotating said coring knife from a normal position in the plane of said splitting blade through an arc in excess of 360° to cause said knife to pass entirely around and sever the core portion in each of said halves and come to rest at an angle to the plane of said splitting blade whereby upon release of the pear halves from said splitting blade the severed core portion in one of said halves is snared by said knife, said coring knife being formed with its cutting edge at a greater distance from the axis of rotation of the knife than its heel portion whereby the latter exerts a drag on said core portions to cause them to turn with respect to the bodies of said pear halves when the knife edge emerges from the pear half upon severing the core portions therefrom and to enable the splitting blade to snare the severed core portion in the other of said halves when the latter is released from said splitting blade, and means for actuating said pear holding means to release said pear halves.

8. In a pear preparation machine, an apertured splitting blade, an arcuately formed rotary coring knife mounted for operation in the aperture of said splitting blade, the axis of rotation of said coring knife being disposed in the plane of said splitting blade, pear holding means adapted to draw a pear rearwardly onto said splitting blade to split the pear into halves and to hold said halves on the splitting blade in position for coring, means operable after said coring knife has rotated to move the pear halves forwardly and to actuate the holding means to release the pear halves, and means normally positioning the blade of said coring knife in the plane of said splitting blades adjacent the forward edge of the aperture therein and operative to rotate said coring knife to sever the core portions from said pear halves and bring the knife to rest in position adjacent the forward edge of said aperture but at an angle to the plane of said splitting blade whereby upon forward movement of said pear half the coring knife will snare the core portion in one of said halves.

9. In a pear preparation machine, an apertured splitting blade, an arcuately formed rotary coring knife mounted for operation in the aperture of said splitting blade, said coring knife being angularly disposed to the path of its travel with the axis of rotation of the coring knife disposed in the plane of said splitting blade, pear holding means adapted to draw the pear rearwardly onto said splitting blade to split the pear into halves and to hold said halves on the splitting blade in position for coring, means operable after said coring knife has rotated to move the pear halves forwardly and to actuate the holding means to release the pear halves, and means normally positioning the blade of said coring knife in the plane of said splitting blade adjacent the forward edge of the aperture therein and operative to rotate said coring knife to sever the core portions from said pear halves, the angular position of the coring knife being such as to exert a dragging effect upon the core portions to turn the same whereby upon forward movement of said pear halves the splitting knife will snare the core portions in one of said halves.

10. In a pear preparation machine having a splitting blade, an arcuate coring knife normally positioned in the plane of said splitting blade, and a reciprocating pear-holding means adapted to draw the pear onto said splitting blade to cut the pear in half and to position the halves of the split pear with respect to said coring knife so that upon rotation of said knife the core portions will be cut out of the pear halves: an intermittently-operated drive mechanism adapted to rotate said coring knife when the pear has been positioned for core-cutting by said holding means and to bring said knife to rest outside the plane of said splitting blade to snare the core portion in one of said halves when said pear halves are released by said holding means, and means for returning said coring knife to coplanar relation with said blade after said pear halves are released.

11. In a pear preparation machine, means for holding a split pear including a member having a flat portion for contacting the cut faces of the pear halves, a rotary coring knife having an arcuate blade formed with a cutting edge and a heel portion normally positioned in the plane of said member, means for rotating said knife such that its cutting edge passes entirely around the core portions of said pear halves and comes to rest at an angle to the plane of said member, said cutting edge of said knife blade being farther from the axis of rotation of said knife than said heel portion thereof whereby the latter exerts a drag on the core portions causing them to turn relative to their respective pear halves when the knife rotates to its rest position following completion of the core cutting, to thereby facilitate subsequent separation of the core portions from the pear halves, and means for restoring said knife to its normal position following removal of the core portions from the pear halves.

12. In a pear preparation machine, a splitting blade, an arcuately formed rotary coring knife associated with said splitting blade and having a cutting edge and a heel portion, means mounting said coring knife for rotation about an axis lying in the plane of said splitting blade, pear holding means adapted to draw a pear onto said splitting blade to split the pear into halves and then position said halves on opposite sides of said knife for coring thereby, and means for rotating said coring knife to cause said knife to pass entirely around the core portion in each of said halves and emerge from the cut faces of said halves whereby to sever the core portion therefrom, said coring knife being formed with its cutting edge at a greater distance from the axis of rotation of the knife than its heel portion whereby the latter exerts a drag on said core portions to cause them to turn with respect to the bodies of said pear halves when the knife edge emerges from the pear halves upon severing the core portion therefrom.

13. In a pear preparation machine, an apertured splitting blade, an arcuately formed rotary coring knife mounted for operation in the aperture of said splitting blade, the axis of rotation of said coring knife being disposed in the plane of said splitting blade, pear holding means adapted to draw a pear rearwardly onto said splitting blade to split the pear into halves and hold said halves on the splitting blade in position for coring, said holding means comprising a gauge to contact the butt of the pear and clamps to contact the sides of the pear, means operable after said coring knife has rotated, to move said gauge forwardly and to actuate said clamps to release the pear, and means normally positioning the blade of said coring knife in the plane of said splitting blade adjacent the forward edge of the aperture therein and operated to rotate said coring knife to sever the core portion from said pear halves and bring the knife to rest in position adjacent the forward edge of said aperture but at an angle to the plane of said splitting blade whereby upon forward movement of said gauge the coring knife will snare the core portion in one of said pear halves.

14. In a pear preparation machine having means for splitting the pear in half, a coring knife, and means for holding the halves of the split pear in position with respect to said coring knife so that upon actuation thereof the core portion will be cut out of the pear halves: a shaft which controls the actuation of said knife, an intermittent one way drive to rotate said shaft from a starting position, which corresponds to the position of said knife at the start of the core-cutting operation, to a stopping position, which corresponds to a position of said knife after it has rotated in excess of 360 degrees into engagement with one of the cut-out core portions, and a restoring mechanism operated during the rest period of said intermittent drive to reversely rotate said shaft from its stopping position back to its starting position.

ALBERT R. THOMPSON.